United States Patent [19]
Dubble

[11] Patent Number: 5,403,393
[45] Date of Patent: Apr. 4, 1995

[54] THICK FILM WASHOUT RESISTANT COATINGS

[76] Inventor: William H. Dubble, 10169 Orange St., Alta Loma, Calif. 91737

[21] Appl. No.: 191,779

[22] Filed: Feb. 3, 1994

[51] Int. Cl.$^6$ ............... C09D 195/00; C09D 7/12
[52] U.S. Cl. ............... 106/277; 106/287.24; 523/332; 524/400
[58] Field of Search ............... 106/277, 287.24; 523/332; 524/400

[56] References Cited

U.S. PATENT DOCUMENTS

| | | | |
|---|---|---|---|
| 4,386,992 | 6/1983 | Takegawa | 156/327 |
| 4,571,415 | 2/1986 | Jordan, Jr. | 524/428 |

FOREIGN PATENT DOCUMENTS 0441037 10/1990 European Pat. Off. ....... C09D 5/02

*Primary Examiner*—David Brunsman

[57] ABSTRACT

This invention relates to water-based coatings for exterior surfaces which upon application quickly develop resistance to being washed out by inadvertent precipitation. These compositions comprise an aqueous anionically stabilized dispersion of water-insoluble polymer prepared by either emulsion polymerization or mechanical emulsification, inorganic pigment dispersed with anionic polymers, salts, or soaps, and the propionic acid salt of calcium.

5 Claims, No Drawings

THICK FILM WASHOUT RESISTANT COATINGS

BACKGROUND OF THE INVENTION

1. Field of the Invention

This invention relates to water-based coating compositions for exterior surfaces which upon application quickly develop resistance to being washed out by inadvertent precipitation. These compositions comprise an aqueous dispersion of water-insoluble latex polymer prepared by emulsion polymerization, inorganic pigment dispersed with anionic polymers, salts or soaps and a water-soluble salt of a multivalent metal such as the propionic acid salt of calcium.

This invention relates to water-based coatings for exterior surfaces. Exterior coatings are exposed to the vicissitudes of weather from the very moment they are applied to protect an exterior surface. Water-based coatings are favored over solvent borne coatings for a number of well known reasons. They offer ease of application, reduced toxic solvent emission, lower raw material and application costs, and easy cleanup of site and equipment. However, water-based coatings are particularly vulnerable to water damage during and immediately after application. A sudden summer shower can wash away or otherwise damage the result of many hours of labor and waste valuable materials.

2. BRIEF DESCRIPTION OF THE PRIOR ART

Exterior water-based coatings may be formulated using aqueous dispersions of water-insoluble polymer latex as binders. After application, the aqueous carrier evaporates, and the individual latex particles coalesce to form an integral film. Some applications require relatively thick coating films. For example, coatings for formed-in-place polyurethane foam which is used to thermally insulate and protect institutional, commercial and industrial roofs, are relatively thick, conventionally on the order of 20-40 mils (0.05-0.10 cm). These coatings are frequently referred to as "roof mastics." Roof mastics are often applied by spray techniques which allow many acres of coating to be applied during a single work period. Because they are applied as a thick coating, they lose water by evaporation relatively slowly in comparison with other polymer latex coatings products such as house paints which are typically applied at 5-8 mils (0.013-0.02 cm). Thus, roof mastics are particularly vulnerable to being washed off by unanticipated precipitation. Typically to avoid having the roof mastic washout it is necessary to apply the full thickness in two or more separate applications which effectively doubles or triples the labor costs of the coating application. A substantial need exists for water-based roof mastics and other exterior water based coatings products which resist washout immediately after application or shortly thereafter ("early" washout resistance) and can be sprayed on vertical surfaces in any thickness without sagging or running. A water based coating that can be sprayed to any thickness on a vertical surface without sagging, running, or washout due to unanticipated precipitation could be applied in one application in the case of a roof mastic thereby eliminating the need for a second or third coat to obtain the desired thickness. This would reduce the labor costs significantly.

In U.S. Pat. No. 4,571,415, a water-soluble salt of a multivalent complex ion having labile, volatile ligands such as zinc ammonium complex ion is added to the roof mastic to make a one part composition. It is believed that early washout resistance results from multivalent metal ion precipitation of the anionic polymers used to disperse pigments and that the multivalent metal ions become available for such precipitation as the complex metal ion is shifted through the various equilibria linking it to the metal ion. The ligand, for example, is believed to be lost at the surface of the applied coating or caulk to the atmosphere. There are some problems with incorporating the flocculant into the roof mastic composition before it is applied to the roof, as in U.S. Pat. No. 4,571,415. Zinc tetramine bicarbonate requires high formulation pH (e.g., >10) in order to maintain shelf stability. There also have been objections to the ammonia odor. Although the use of zinc tetramine bicarbonate speeds up the gel time of the resultant coating, by the very nature of it being used in one component system it can only speed up the coating so much before it reduces the package stability of the finished coating or mastic. The object of the present invention does away with stability problems because the preferred method of application is as a two component system. An added benefit of this invention is that the flocculating agent calcium propionate has very low toxicity and no odor as applied in preferred method of application.

DETAILED DESCRIPTION OF THE INVENTION

The compositions of the present invention comprise two parts 1) an aqueous dispersion of water-insoluble anionically stabilized latex polymer prepared by emulsion polymerization or mechanical emulsification, pigment dispersed with anionic polymers or salts, and 2) the calcium salt of propionic acid.

When applied as a two component cosprayed system as detailed below (Methods of Application) the compositions of this invention are particularly useful as washout resistant coatings for exterior surfaces, especially when applied to horizontal or vertical surfaces such as roofs or walls on industrial, commercial and institutional buildings. These compositions find particular use over foamed in place polyurethane foam roofs to protect the foam from the suns ultraviolet rays which would quickly degrade the polyurethane foam. These compositions can also be used over built-up roofing formed from roofing felts and asphalt or tar which help to extend the life of the roof.

PART A.

Suitable aqueous anionically stabilized latex binders of water-insoluble polymers are available commercially from a number of vendors but those from Rohm and Haas Company under the trade name Rhoplex and specifically Rhoplex EC1791 are preferred. The relative amount of polymer latex used in the compositions of the present invention depends on the desired application. In general the weight ratio of inorganic pigment to binder may be from 1/1 to about 5/1, preferably about 1/1 to 4/1. In the case of roof mastics, a pigment-to-binder ratio of from 1/1 to 3/1 may be used with a ratio of 2/1 preferred. It is desirable to maintain the pigment volume concentration below the critical pigment volume concentration, as is well known in the coatings art.

Another embodiment of this invention replaces the anionically stabilized latex binders of water insoluble polymers formed by emulsion polymerization with an anionically stabilized asphalt emulsion binder prepared by mechanical emulsion techniques (i.e. colloid mill). As the flocculating agent (PART B) acts specifically on the anionic polymers and soaps which stabilize both types of emulsion, the end results are the same. Therefore both types of emulsions can be used interchangeably in the description of the invention even though the example is directed at the polymer formed by emulsion polymerization. The additives, formulating techniques, pigments, and applications are all interchangeable with the two binder systems and will be immediately obvious to those skilled in the coatings art.

As used in the specification and claims, the word "pigment" denotes both organic and inorganic materials which are used to impart aesthetic and functional qualities such as rutile and anatase titanium dioxide, and inorganic materials which are used to fill the compositions, such as calcium carbonate ("fillers"). The pigments are present in an amount of from 10 percent to 90 percent by weight of the total solids in the composition depending upon the consistency desired, the presence or absence of thickening agents, the amount and identity of cosolvent utilized, and so forth. Suitable pigments include rutile and anatase titanium dioxide, calcite, limestone, mica talc, asbestos fiber or powder, cellulose fiber or powder, diatomaceous earth, barytes, alumina, slate flour, calcium silicate, clay, colloidal silica, magnesium carbonate, magnesium silicate, zinc oxide and so on. The amounts of cosolvent, if any, pigment and polymer solids are such as to give a viscosity approximately 80–120 K.U.

The pigments used in the composition of this invention are dispersed using high speed dispersion equipment such as a Cowles disperser. Anionic polymers, such as polyacrylate or polyphosphate are used as dispersing aids and in stabilizing the dispersion. Copolymers of acrylic acid and/or methacrylic acid with lower alkyl acrylates are preferred as dispersants. In another preferred embodiment, potassium tripolyphosphate is used to disperse the inorganic pigments. The amount of dispersant used depends on the surface area of the pigment employed per unit volume of the composition. The amount and combination of dispersants are easily determinable by those skilled in the coatings art by conventional techniques.

The anionic dispersants which may be used are anionically charged polymeric materials used to disperse the inorganic materials used to pigment or fill the coating or roof mastic compositions of the present invention. Sodium tripolyphosphate (CAS Reg. No. 7758-29-4) is a preferred anionic dispersant as is potassium tripolyphosphate. Polyacrylates are also preferred dispersants, and the combination of polyacrylates and polyphosphates are especially preferred. Other types of "condensed" phosphates, that is dehydrated polymerized orthophosphate in which the $H_2O$ to $P_2O_5$ ratio is less than 3 to 1, may be used. Sulfonated polymers, including naphthalene-formaldehyde sulfonated polycondensates, polymaleates, natural product-derived dispersants, such as tannins, lignins, alginates, gluconates, glucocides, organic phosphonates, may be used. Sodium or potassium soaps of any carboxylic acid such as tall oil fatty acid can also be used. The amount of dispersant or soap used depends on the surface area of the pigment employed per unit volume of the composition. The amount is easily determined by those skilled in the coatings art by conventional techniques. The compositions of the present invention may also include conventional coatings ingredients such as can preservatives, antimicrobial agents, mildewcides, anti-freeze agents, coalescents, defoaming agents, colorants, dyes, cosolvents, plasticizers and adhesion promoters. All of these additives and their use levels are all familiar to anyone skilled in the coatings art.

PART B

Calcium propionate is a well known food additive used as a mold inhibitor for baking bread. It has very low toxicity and although it has good water solubility it is not hydroscopic or deliquescent as most calcium salts are (e.g. calcium chloride, calcium acetate, etc.). Calcium propionate also forms water solutions with very high concentrations of soluble calcium ions by virtue of the low molecular weight of the propionic acid ligand. Calcium ions being multivalent ions, complex anionic polymers and soaps. It is believed that the early washout resistance of the resultant coating is the result of multivalent metal ion precipitation of the anionic polymers used to emulsify the water insoluble resin and the anionic polymers, salts, and soaps used to disperse the pigments in the finished coating. The anionic polymers, salts, and soaps in the finished water-based coating of the previous prior art constitute the majority of the water sensitivity in the finished coating. By rendering these anionic polymers, salts and soaps water insoluble by cospraying with the calcium propionate solution the resulting coating mixture is rendered basically water insoluble en masse. Because of this the resultant coating mixture can be cosprayed to any thickness even on a vertical or overhead surface without running or sagging. This same coating mixture becomes virtually water insensitive almost immediately and can withstand the effects of a water hose within 60 seconds of its application even when sprayed on one inch thick in a single vertical application.

The ratio of coating as comprised in PART A to calcium propionate solution in PART B can be varied to infinitely control the rate of gelation of the resultant coating mixture. The useful ratio based on solids is 100 (PART A) /0.1 (PART B) up to 100 (PART A) /5 (PART B). The following example is provided to further illustrate the invention. This example should not be read as limiting the scope of the invention which is described in the claims.

EXAMPLE

| INGREDIENT | PART A (Roof Mastic) FUNCTION | LBS/100 GAL |
|---|---|---|
| Natrosol 250 MXR (3%) | Thickener | 140.74 |
| Water | | 16.00 |
| Tamol 850 | Anionic Secondary Dispersant | 4.75 |
| KTPP | Anionic Primary Dispersant | 1.43 |
| Ethylene glycol | Coalescent | 24.38 |
| Nopco NXZ | Defoamer | 3.80 |
| Ti-Pure R960 (TiO$_2$) | Whitener | 70.37 |
| Duramite (CaCO$_3$) | Extender | 422.72 |
| Kadox 515 (ZnO) | Whitener/Stabilizer | 46.95 |
| Rhoplex EC-1791 | Emulsion binder | 470.59 |
| Texanol | Coalescent | 6.95 |
| Skane M-8 | Mildewcide | 2.10 |
| Ammonium hydroxide | pH adjustment | 0.95 |

| Sources of Materials Recommended | |
|---|---|
| Ingredient | Supplier |
| Natrosol 250 MXR | Aqualon, Inc., Wilmington, DE |
| Tamol 850 | Rohm and Haas Co., Philadelphia, PA |
| KTPP | FMC Corp., Philadelphia, PA |
| Nopco NXZ | Henkel Corp., Ambler, PA |
| Ti-Pure R960 | E. I. Dupont de Nemours & Co. Inc., Wilmington, DE |

-continued

| EXAMPLE | |
|---|---|
| Duramite | Thompson-Weiman & Co., Cartersville, GA |
| Kadox 515 | New Jersey Zinc, Bethlehem, PA |
| Rhoplex EC-1791 | Rohm and Haas Company, Philadelphia, PA |
| Skane M-8 | Rohm and Haas Company, Philadelphia, PA |
| Texanol | Eastman Kodak, Rochester, NY |

| PART B (Flocculating agent) | |
|---|---|
| Ingredient | LB's |
| Water | 80 |
| Calcium propionate | 20 |

METHOD OF APPLICATION

Preferably the flocculating agent (PART B) and the roof mastic (PART A) are simultaneously applied to the substrate. In one embodiment, PART A and PART B are each sprayed as converging or overlapping streams and mix in the state of mist as they are applied to the substrate. The particular spraying machine used to apply the coating in the embodiment is not critical and includes any machine that can spray both PART A and PART B so that the spraying areas overlap. For example a spray gun having two spray nozzles (e.g., Binks Model 69GW plural component spray gun, Binks Manufacturing Co., Franklin Park, Ill.) can be used.

At the ratio of 100 (PART A) /5 (PART B) the mixture of the above example will literally gell in the air as it is being cosprayed and will be able to withstand a water hose after 60 seconds even when sprayed continuously on a vertical or overhead surface until it is one inch thick.

As an alternative to simultaneous cospraying, PART B (flocculating agent) can be sprayed as a second coating on top of PART A (roof mastic). Although the results are not as impressive as cospraying, this alternative approach would prevent early washout but you would lose the benefit of being able to spray the roof mastic composition to any thickness desired on a vertical or overhead surface.

SUMMARY OF THE INVENTION

It is the object of the present invention to provide washout resistant exterior coatings that can be applied virtually to any thickness on a vertical or even an overhead surface. This invention advantageously provides a coating process which can be used to formulate exterior water-based coatings, including roof mastics, which quickly develop resistance to being washed away by any amount of precipitation. This invention permits coatings applicators to work despite weather forecasts which would rule out the application of prior art water-based coatings at thicknesses that would cover virtually any application requirement horizontal, vertical, or overhead. Because the curing mechanism of the present invention works independently of the ambient humidity, the coatings and roof mastics detailed can be considered for use in parts of the country where the high average humidity has precluded the use of water-based coatings in general. This would in general expand the use of water based coatings throughout the year instead of just the summer months. This in general would reduce the use of solvent based coatings in the months of the year when a water based coating of the prior art simply would not dry. The environmental impact of this invention when viewed on a national scope would greatly reduce the solvent emissions normally associated with solvent borne exterior coatings and roof mastics.

I claim:

1. An improved roof mastic or exterior coating composition displaying superior washout resistance comprising:
   a) an aqueous anionic dispersion of water-insoluble latex polymer prepared by emulsion polymerization, pigments dispersed with anionic polymers, salts, or soaps
   b) the water soluble propionic acid salt of calcium.

2. A composition as in claim 1, wherein a) is an aqueous anionic dispersion of asphalt prepared by mechanical emulsification, pigments dispersed with anionic polymers, salts, or soaps.

3. A process of coating an exterior surface comprising applying the composition of claims 1 or 2 to said surface.

4. The process of claim 3, wherein the process comprises mixing a) and b) prior to application to said surface.

5. The process of claim 3, wherein the process comprises mixing a) and b) after one of a) or b) has been applied to said surface.

* * * * *